US008170834B2

(12) United States Patent
Knepler et al.

(10) Patent No.: US 8,170,834 B2
(45) **Date of Patent: *May 1, 2012**

(54) REMOTE BEVERAGE EQUIPMENT MONITORING AND CONTROL SYSTEM AND METHOD

(75) Inventors: John T. Knepler, Springfield, IL (US); Timothy Paul Kaeding, Mechanicsburg, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 537 days.

This patent is subject to a terminal disclaimer.

(21) Appl. No.: 11/908,779

(22) PCT Filed: Mar. 10, 2006

(86) PCT No.: PCT/IB2006/050767

§ 371 (c)(1),
(2), (4) Date: Aug. 25, 2008

(87) PCT Pub. No.: WO2006/097885

PCT Pub. Date: Sep. 21, 2006

(65) Prior Publication Data

US 2009/0216490 A1 Aug. 27, 2009

Related U.S. Application Data

(63) Continuation-in-part of application No. 11/080,740, filed on Mar. 15, 2005, now Pat. No. 7,162,391, which is a continuation-in-part of application No. 10/168,770, filed as application No. PCT/US01/28227 on Sep. 10, 2001, now Pat. No. 7,158,918.

(60) Provisional application No. 60/231,762, filed on Sep. 12, 2000.

(51) Int. Cl.
*G06F 3/00* (2006.01)
*G06F 3/01* (2006.01)
*G06F 13/10* (2006.01)

(52) U.S. Cl. ......... 702/182; 702/184; 702/185; 702/188

(58) Field of Classification Search .................... 702/50, 702/81, 137, 182, 183, 185, 187, 188; 99/275; 141/83; 221/125; 700/231, 237
See application file for complete search history.

(56) References Cited

U.S. PATENT DOCUMENTS 3,927,800 A 12/1975 Zinsmeyer et al.
(Continued)

FOREIGN PATENT DOCUMENTS

EP 0 922 425 12/1997
(Continued)

OTHER PUBLICATIONS

International Search Report issued in application No. PCT/IB06/050767 (2007).

*Primary Examiner* — Mohamed Charioui
*Assistant Examiner* — Felix E Suarez
(74) *Attorney, Agent, or Firm* — Barnes & Thornburg LLP

(57) ABSTRACT

The present disclosure provides a system and method for monitoring and controlling modifications to beverage equipment. The system includes at least one beverage equipment which may include a controller. The controller communicates over a communications network with a data collection server which may be accessible to a central office or equipment provider. A method is also disclosed for first monitoring or querying beverage equipment for a setting or configuration modification. Next, the modification may be compared against a modification threshold to determine whether the modification warrants corrective action. A corrective action may include but is not limited to, resetting the equipment to original or default settings, notifying an end user, notifying the equipment providers, logging the action, or some combination of two or more of these actions.

49 Claims, 4 Drawing Sheets

U.S. PATENT DOCUMENTS 4,237,536 A 12/1980 Enelow et al.
4,265,371 A 5/1981 Desai et al.
4,295,044 A 10/1981 Anderson et al.
4,412,292 A 10/1983 Sedam et al.
4,484,515 A 11/1984 Illy
4,531,046 A 7/1985 Stover
4,821,921 A 4/1989 Cartwright et al.
4,827,426 A 5/1989 Patton et al.
5,094,153 A 3/1992 Helbling
5,203,366 A 4/1993 Czeck et al.
5,339,250 A 8/1994 Durbin
5,360,140 A 11/1994 Senghaas
5,546,444 A 8/1996 Roach, Jr. et al.
5,590,999 A 1/1997 Murphey
5,769,271 A 6/1998 Miller
5,844,808 A 12/1998 Konsmo et al.
5,875,430 A 2/1999 Koether
5,963,452 A 10/1999 Etoh et al.
6,036,055 A 3/2000 Mogadam et al.
6,050,447 A * 4/2000 Kovens et al. ................ 221/125
6,092,693 A 7/2000 Powell
6,127,185 A 10/2000 Melton et al.
6,155,158 A 12/2000 Anson
6,182,555 B1 2/2001 Scheer et al.
6,192,737 B1 2/2001 Ohlrogge et al.
6,213,174 B1 * 4/2001 Cook et al. ...................... 141/83
6,305,268 B1 10/2001 Schamberg et al.
6,600,969 B2 * 7/2003 Sudolcan et al. ............. 700/237
6,606,602 B1 8/2003 Kolls
7,158,918 B2 1/2007 Bunn et al.
7,162,391 B2 * 1/2007 Knepler et al. ............... 702/182
2002/0122844 A1 9/2002 Cooke et al.
2005/0139080 A1 * 6/2005 De'Longhi ..................... 99/275

FOREIGN PATENT DOCUMENTS

WO 02/23735 3/2002

* cited by examiner

REMOTE BEVERAGE EQUIPMENT MONITORING AND CONTROL SYSTEM AND METHOD

CROSS REFERENCE TO RELATED APPLICATIONS

This application is a U.S. nationalization of international patent application no. PCT/IB2006/050767, filed Mar. 10, 2006, which claims the benefit of U.S. patent application Ser. No. 11/080,740, filed Mar. 15, 2005 (issued as U.S. Pat. No. 7,162,391 on Jan. 9, 2007), which is a Continuation-in-Part of U.S. patent application Ser. No. 10/168,770, filed May 29, 2003 (issued as U.S. Pat. No. 7,158,918 on Jan. 2, 2007), which is a U.S. nationalization of PCT/US2001/028227, filed Sep. 10, 2001, which claims the benefit of U.S. provisional patent application No. 60/231,762, filed Sep. 12, 2000. The disclosures set forth in the referenced applications are incorporated herein by reference in their entirety.

BACKGROUND AND SUMMARY OF THE INVENTION

This invention relates generally to food preparation equipment, and more specifically to food preparation equipment having communication capabilities.

By way of background, a variety of food preparation apparatus are available in which a product, such as a food concentrate or food base, is combined or otherwise mixed with water or another liquid. In this regard, most beverages, as well as other liquid food substances, such as soups, are not ready to drink and are prepared by mixing water, either hot or cold, with such a product. For example, there are numerous devices which combine powdered or liquid concentrate coffee products with water to produce a reconstituted or mixed coffee beverage having a desired flavor. Similarly, some fountain-type beverage devices may be capable of dispensing carbonated beverages, as well as juice or other non-carbonated beverages, by mixing a syrup or powdered beverage product with carbonated or non-carbonated water to produce a diluted or reconstituted beverage.

Beverage making equipment may be deployed by an equipment provider to end users in a variety of business models. By way of example, but not limitation, end users may be restaurants, convenience stores, hotels, motels, stadiums and other entertainment facilities, health care facilities, and other large institutional settings. The franchise model is one business model in which each store in a chain may use similar beverage making equipment, configured in a similar manner to provide for uniformity and quality control throughout the franchisee locations. Using the same beverage equipment through the locations may also provide for volume discounts for the franchise owner and its respective franchisees as well as simplifying training, documentation, and repair procedures. Although the franchise model is used as an example, there may be other business models that deploy equipment to multiple locations with similar efficiency and cost concerns.

One problem with such deployments is the possibility of end-user modifications to default, preferred, or globally mandated settings. End users, such as shop operators, or the equipment operator themselves, may adjust or modify settings for a variety of purposes, some of which may be legitimate and some which may not. For example, an end-user may reduce the amount of beverage powder that is dispensed per serving in order to reduce raw material costs. Such modification may diminish the quality of the product or otherwise vary the product from its intended characteristics. Other configuration or settings modifications may be due to operator error, equipment misuse, or unintentional reconfiguration. The preceding reasons for beverage equipment modifications are intended to be non-limiting examples; a host of other reasons for a modification are possible as well.

Briefly, in accordance with the foregoing, the present disclosure provides a system and method for monitoring and controlling modifications to a configuration, setting, or state of beverage equipment. The system includes at least one piece of beverage equipment which includes a controller. The controller communicates with a data collection system which may be accessible by a central office, equipment provider, or other interested party. A method is also disclosed for first monitoring or querying beverage equipment for modification. The modification may be compared against a modification threshold to determine whether the modification warrants a corrective action. A corrective action may include but is not limited to, resetting the equipment to original or default settings, notifying the end user, notifying the equipment providers, logging the action, or some combination these actions.

Additional features will become apparent to those skilled in the art upon consideration of the following detailed description of drawings exemplifying the best mode as presently perceived.

BRIEF DESCRIPTION OF THE DRAWINGS

The present invention and the advantages thereof will become more apparent upon consideration of the following detailed description when taken in conjunction with the accompanying drawings of which.

DESCRIPTION OF EMBODIMENTS OF THE INVENTION

Figure 1:
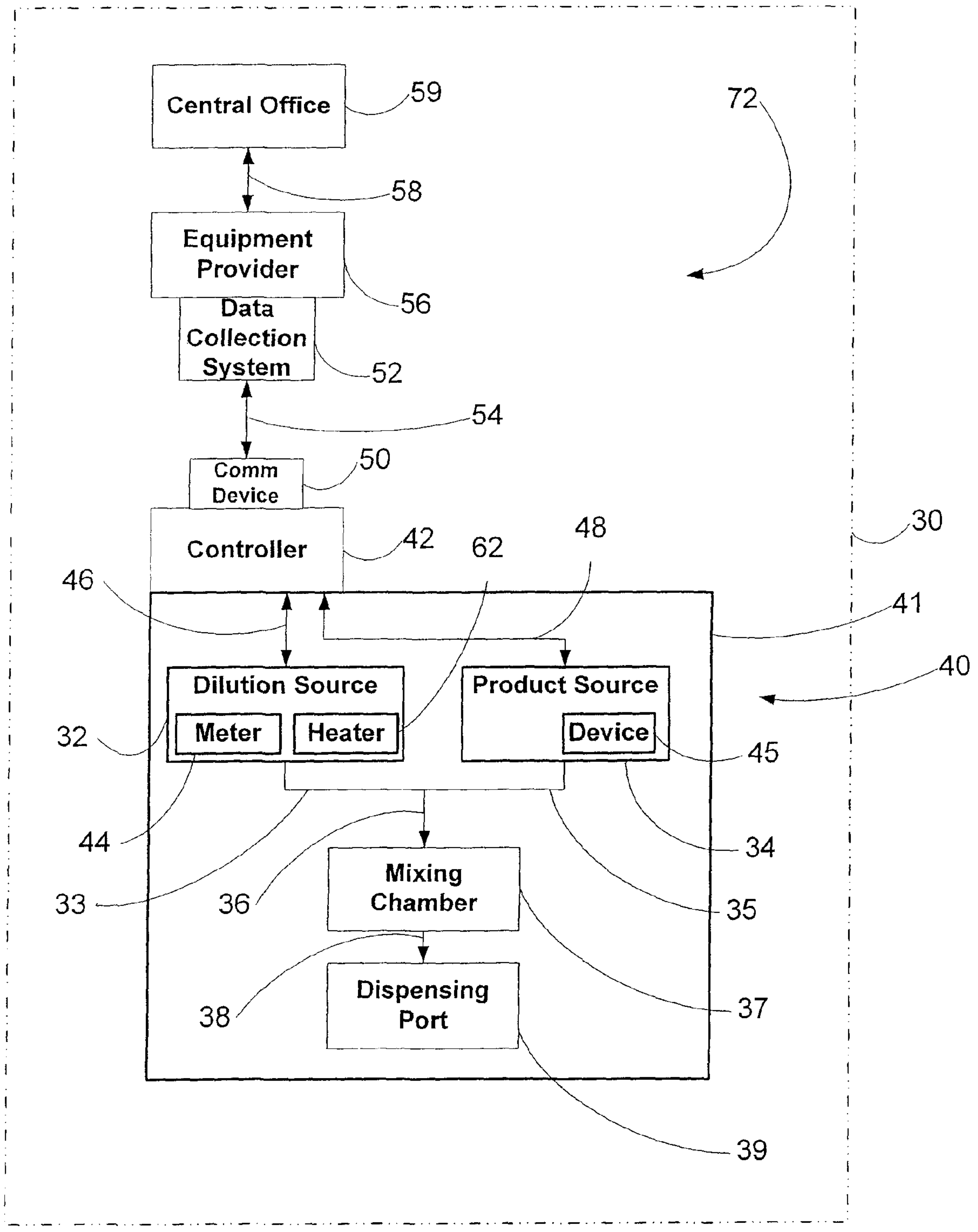
FIG. 1 is a diagrammatic illustration of a system, wherein beverage equipment communicates information regarding settings, configuration, or states to a data collection system.

While the present disclosure may be susceptible to embodiment in different forms, there is shown in the drawings, and herein will be described in detail, embodiments with the understanding that the present description is to be considered an exemplification of the principles of the disclosure and is not intended to limit the disclosure to the details of construction and the arrangements of components set forth in the following description or illustrated in the drawings.

The present disclosure may be used in connection with a variety of beverage making machines. Terms including beverage, mixing, powder, drink and other related terms as may be used herein are intended to be broadly defined as including, but not limited to, the making of coffee, tea and any other beverages or food substances. This broad interpretation is also intended to include, but is not limited to any process of dispensing, infusing, steeping, reconstituting, diluting, dissolving, saturating or passing a liquid through or otherwise mixing or combining a beverage substance with a liquid such as water without limitation to the temperature of such liquid unless specified. This broad interpretation is also intended to include, but is not limited to beverage substances such as ground coffee, tea, liquid beverage concentrate, powdered beverage concentrate, flaked, granular, freeze dried or other forms of materials including liquid, gel, crystal or other forms of beverage or food materials to obtain a desired beverage or other food product.

With reference to FIG. 1, an embodiment of the present invention provides a system 30, and a method which uses the system 30 which may include a dilution source 32 and a product source 34. The dilution source 32 primarily provides dilution material 33 to the system 30, and the product source 34 provides beverage product 35 to the system 30. However, it should be noted that the dilution material may be water, as well as any number of other dilution materials. For example, while water primarily will be used as a dilution material in beverage or food product preparation, as described below, it is anticipated that other dilution materials, such as milk, carbonated water, and other beverage or food bases, might be used. Moreover, the devices used to dispense dilution material could be any one of a variety of pumps, controllable valves, or other controllable dispensing devices. Reference hereinbelow will be made to dispensing water with the understanding that the term "dilution source" is to be broadly defined.

Figure 4:
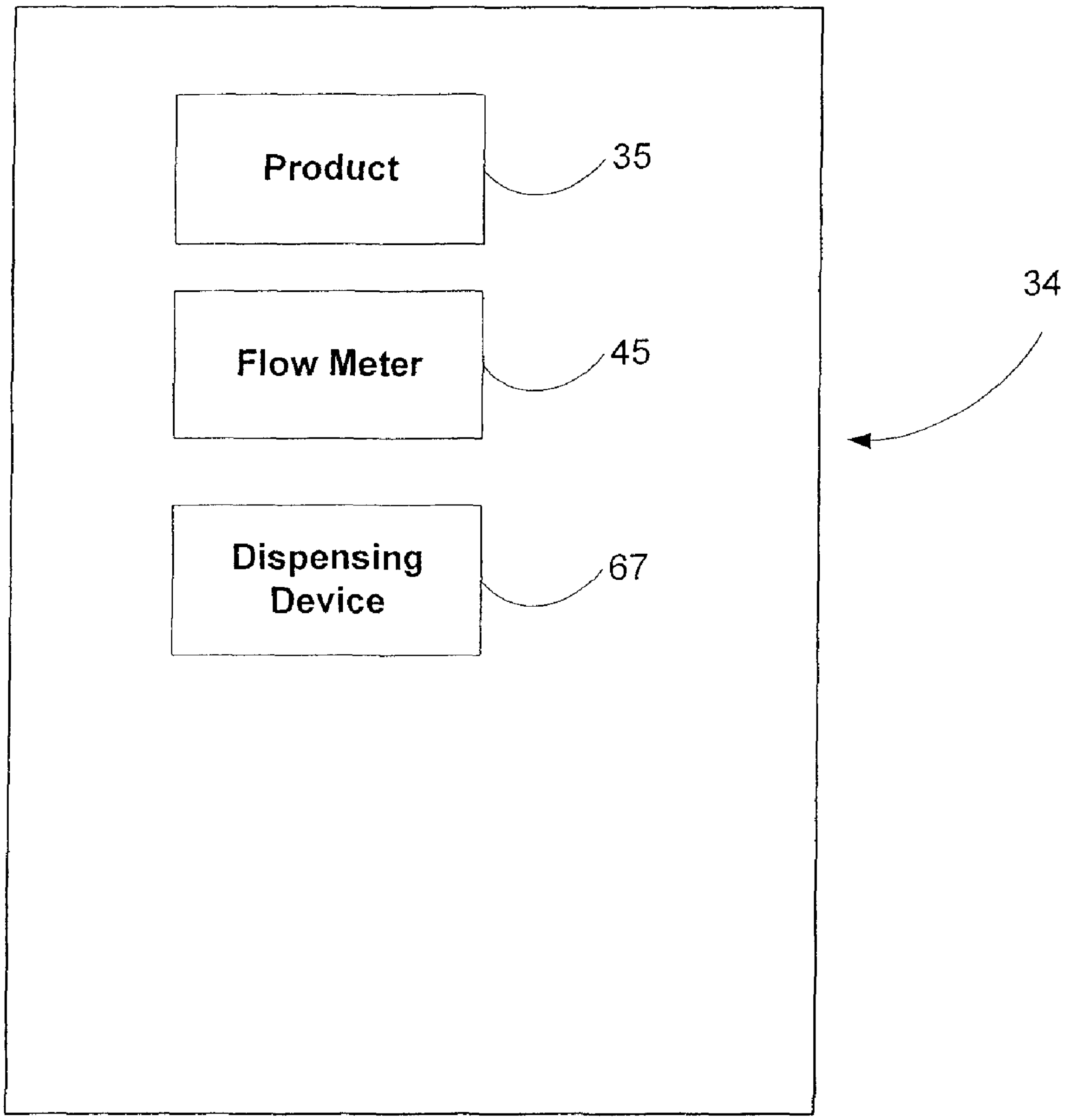
FIG. 4 is a diagrammatic illustration of the product source of FIG. 1.

Similarly, the product source 34 is considered to be broadly defined and interpreted, and includes any number of products 35. The products 35 may be concentrated or reduced forms of the beverages, drinks, or other food products which, when combined or mixed 36 such as in a mixing chamber 37 with water dispensed from the dilution source 32 at a predetermined specific ratio, form a properly prepared resultant combination 38, referred to herein as a drink or beverage that is ready to be dispensed such as out a dispensing port 39. The product source 34 may dispense any number of products, such as juice concentrates, soda syrups, ground coffee, tea leaves, powdered concentrates, such as coffee, tea, juices, soups, and other beverages or food products. Moreover, the devices 67 (FIG. 4) used to dispense product 35 could be any one of a variety of pumps, auger dispensers, gravity feed dispensers, or other controllable dispensing devices. Reference hereinbelow to the term "product source" is to be broadly defined and interpreted.

The dilution source 32 and product source 34 are part of an apparatus 40 which includes a controller 42 to controllably dispense desired predetermined quantities of the dilution material 33 to be mixed with product 35 to form the drink 38. The controller 42 may be internally kept within apparatus 40, or be externally connected. The controller 42 may also be configured to control the product source 34, or the product source 34 may instead be configured to be batched by an operator.

Consistent with the broad definitions provided hereinabove with regard to the dilution material and product, the drink may take the form of a finished, mixed, combined food product, such as a coffee beverage, soup, carbonated beverage or juice. In general, the drink is a food product which results from the mixing of the two components of which at least the dilution material 33 is generally a liquid. In order to further illustrate the broad definitions used herein, it is anticipated that the dilution source 32 may provide dilution material 33 in many forms ranging from a near freezing or freezing state, such as a slush material, to a vaporous or nearly-vaporous state, such as steam, in order to produce the desired drink 38. Dilution source 32 and product source 34 and related mixing and dispensing passages generally make up a beverage dispensing portion 41.

In one embodiment, the dilution source 32 includes a device, such as a flow meter 44, which controls the flow of the dilution water 33. In another embodiment, the product source 34 includes a device such as a flow meter, sensor or other device 45 which is capable of being monitored to directly or inferentially calculate the flow of product 35. As shown in FIG. 1, the system 30 includes the controller 42, and the controller 42 can be configured to control the product source 34 over line 48. The device 45 may also provide information to the controller 42 over line 48.

In either of the foregoing embodiments, lines 46 and 48 may be multiple line conductors or single line conductors, such conductors being of an electrically or optically conductive media, as well as wireless connections in such case lines 46 and 48 showing communication paths and not physical connection. The controller 42 and data collection portion or system 52 may be equipped with appropriate communication devices 50 such as a modem, network card, global positioning and communication device to permit communication of information from the controller 42 to the data collection portion 52 regardless of the location of the apparatus 40. The definitions of the controller, data collection portion, communication paths and communication devices are to be broadly defined and interpreted.

The flow control device including the flow monitor may be positioned in various locations to achieve a desired result. For example, a single flow meter 44 can be placed at the inlet to the entire apparatus 40 so that the total water usage by the apparatus is monitored and reported to the controller 42. Alternatively, the flow meter can be placed at the dispensing outlet of a heated water reservoir which leads to a brewing system so that only the water used to brew is monitored. In the previous example, some brewing systems may include separate dispensing spigots for dispensing hot water only and, thus, would not be included in the calculation of the cost, described hereinbelow, relating to the present disclosure.

Furthermore, multiple flow meters can be placed relative to individual dispensing heads of a multiple dispensing apparatus 40 to record the amount and type dispensed from each head. It should be noted that the flow meter 44 can be used on a pressurized water line, as well as a line in a gravity feed, pour-in basin system. With this in mind, the water meter, as described above, can be used in individual serving apparatus, as well as batch serving apparatus, such as coffee brewing systems, which brew a multiple cup volume.

Similar to the flow control device 44 described hereinabove, the device 45 may be positioned in various locations to achieve a desired result. It should be noted that the flow control devices 44, 45 may be used individually, together, or as a means to provide redundant checking of the system 30. In other words, system 30 may be operated using a flow control device 44 or a device 45. System 30 may also be embodied to use both devices 44, 45. Also, the system 30 may be configured and include programming to rely on one of the devices 44, 45 to provide primary information regarding the use of the apparatus 40 with the other of the two devices 44, 45 to provide redundant information to confirm or challenge the primary information.

In the embodiment which uses a device 45 associated with the product source 34, the dispensing of the product can be monitored by positioning the device on a pump or auger motor used to dispense the product 35. Also, the device 45 can be positioned at the outlet of the product source 34 to monitor the actual outflow. As such, this is another example of the inferential or actual monitoring of the product flow. Furthermore, multiple devices 45 can be placed relative to individual product dispensers of a multiple dispensing apparatus to record the amount and type of each product dispensed.

The system 30 provides communication between the mixing and dispensing apparatus 40 of the system 30 and a data collection portion 52 of the system 30. The data collection portion 52 receives information from the mixing and dispensing apparatus 40 by line 54. As previously discussed with regard to lines 46 and 48, line 54 may be a single, multiple, electrically conductive or optically conductive line, as well as a wireless communication path between the controller 42 and the data collection portion 52.

The controller 42 preferably provides information to the data collection portion 52 including at least the quantity and/or flow rate of the water, product, or both monitored by the flow meter 44 of the dilution source 32 and/or the device 45 of the product source 34. Generally, the controller 42 is in the form of a microprocessor of known construction and includes a memory device. As such, the information may be stored at the controller 42 until accessed or automatically forwarded to the data collection portion 52.

Once the data collection portion 52 has obtained the information from the controller 42, it may be used for a variety of applications. The flow rate information, because it is generally a constant ratio relative to the quantity of product dispensed by the product source 34, may provide information relating to ordering of the product. For example, the information provided by the flow meter 44 or device 45, which may be another flow meter (see FIG. 4) to the controller 42 can be used to record the flow rate, for quantity, time of day, frequency over various periods of time, as well as type of beverage dispensed. For example, the information may be used to develop maintenance schedules, service schedules, product usage tracking (quantity, type, time of day). This information, or selected portions thereof, is valuable business information which may be studied to determine patterns, trends and other analytical information. This information can also be transmitted to or accessed by a supplier 56 on a regular basis as indicated by line 58. Such information can be used to establish a schedule by which an appropriate quantity of product is automatically delivered to the end user to maintain the apparatus based on the historical accumulated information provided by the controller 42.

Communication line 58 may be a two-way communication line such that the data collection portion 52 communicates the ordering requirements to a supplier, central office 59 or equipment provider 56 and the supplier 56 provides confirmation and, perhaps, billing information to the data collection portion 52. The supplier 56 can then provide additional information to the operator of the mixing and dispensing apparatus 40 including configuration, state and settings information.

The present disclosure includes a method in which an equipment supplier can provide an end user with a beverage mixing and dispensing apparatus 40. The equipment supplier and end user enter into an arrangement which includes the communication 54 of information from the controller 42 of the apparatus 40 to the data collection portion 52. The information provided to the data collection portion 52 includes at least flow rate information, whether in the form of dilution material flow rate, product flow rate, or both. As noted above, the flow rate may be the actual flow rate or the inferential flow rate. The agreement between the parties will then allow calculation of billing information relating to the flow rate. The sale of product to the user of the apparatus 40, as provided by the supplier 56, can be calculated based on the water flow rate. Under this method, the user of the apparatus 40 would gain little or no advantage by purchasing product from an alternate source since they would be paying for the system, including the product, based on the water usage, product usage, or both calculated as quantity or servings dispensed. If the product is included in the pricing calculation, purchasing a product from an alternate source would be additional cost and, therefore, a disincentive to using any product except that provided by the data collection source 52.

As a result of this method, the data collection source 52 can control the type and quality of the drink 38 produced by the user of the apparatus 40. Additionally, the user of the apparatus 40 would have no incentive to alter the concentration or dilution of the product and, as such, the drink 38 produced by the apparatus 40 would be predictably consistent.

It should be noted that the data collection portion 52 may or may not be located at and/or operated by the original supplier of the apparatus 40. The data collection portion 52 may actually be a subunit of an entity which purchases and loans such apparatus 40, or manufacturers of such apparatus 40. Additionally, the supplier 56 may be part of the same entity as the data collection portion 52, or may be a separate entity outside of the other entities which produces the product. It should be noted that only a single supplier 56 is shown in FIG. 1, but that multiple suppliers might be used to accommodate the variety of products which might be used in a multiple product apparatus. For example, a system could include a carbonated beverage dispensing point, a coffee beverage dispensing point, a soup drink dispensing point, and a juice beverage dispensing point. As such, multiple suppliers may be needed to provide the multiple product types used in such a system.

With the foregoing in mind, it will also be appreciated that, although a single data collection portion 52 is shown and a single apparatus 40 is shown, it is conceivable that multiple data collection portions 52 and multiple apparatus 40 may be provided. For example, if a franchise entity has multiple apparatus 40 in each of the many multiple locations, a single data collection portion 52 may be dedicated for such a franchise. Additional dedicated data collection portions 52 may be provided for other franchises, as well as other individual non-franchise users.

Figure 2:
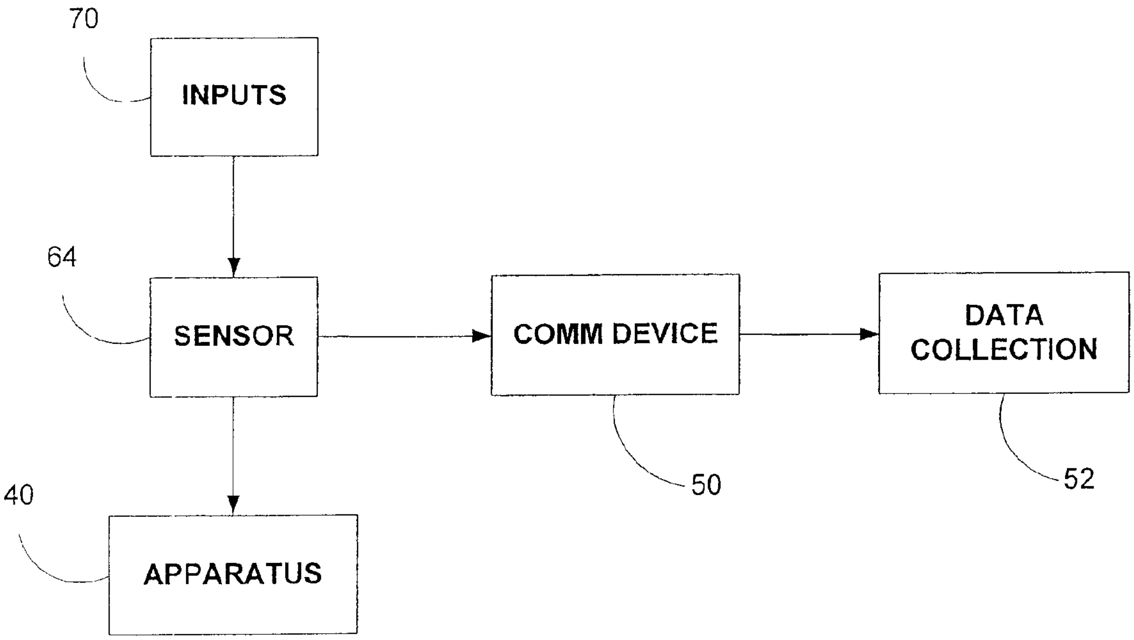
FIG. 2 is a simplified diagrammatic illustration of a data transmission in connection with the system of FIG. 1.

As shown in FIG. 2, the apparatus 40 and data collector or data collection portion 52 of the system 30 may be configured such that information regarding one or more inputs 70 to the apparatus 40 is provided to the data collection portion 52 using one or more sensors 64 and communication or transmission device 50, and the data collection portion 52 uses the information to monitor the performance of the apparatus 40. Sensor 64 may be a flow meter or a meter to measure characteristics of the input power.

Transmission device 50 may include single or multiple line conductors, a modem, and/or wireless communication devices. The information which is provided to the data collection portion 52 regarding the one or more inputs 70 to the equipment 40 may be associated with one or more components of the equipment and, depending on the nature of the component(s) being monitored, may include information relating to voltage (V), current (I), phase angle ($\phi$), time (T), volume of water, or other water parameter, throw weight, recipe parameter, timing parameter, component torque, or stored advertising information. For example, if a purely resistive component, such as a heater 62, is being monitored, it is sufficient to monitor V and I. On the other hand, if a component with some inductance, such as a solenoid 65, is being monitored, phase angle ($\phi$) and time (T) may need to monitored. Furthermore, it is possible to monitor the number of times the solenoid 65 is activated, and calculate the total amount of dilution material which is used over a given period of time (if the assumption is made that a predetermined volume of dilution material is user per solenoid operation). Regardless of what exactly is monitored, being able to remotely monitor an apparatus 40, such as a beverage brewer, preferably avoids the cost and complexity of adding internal components, wiring and plumbing to every apparatus produced in order to monitor the performance thereof.

The data collection portion 52 may be configured to monitor an apparatus 40 which is not specifically designed for monitoring. Alternatively, the apparatus 40 may be specifically configured to facilitate the monitoring by the data collection portion 52. For example, the apparatus 40 may be configured to momentarily turn off one device in the apparatus, such as a tank heater, while another device, such as a solenoid, is turned on. This permits more precise and accurate monitoring by the monitoring equipment (i.e., the data collection portion 52). Precision and accuracy of monitoring is increased because the relatively small solenoid current would not be hidden or masked by the presence of a large tank heater current. In other words, the characteristic being monitored, in this example current, is monitored in the absence of other, potentially confusing characteristics.

As discussed, the information provided to the data collection portion 52 may relate to voltage (V), current (I), phase angle (ϕ), and time (T) or other monitorable characteristics. Because at least one of the inputs 70 measured by the data collection portion 52 could be current, information could be communicated to the data collector by pulsing the current in a predetermined code. For instance, if the controller 42 of the apparatus 40 determined that the time it took to reheat after a brewing cycle was extensive, the controller 42 could be configured to pulse a solenoid in a coded sequence. This would signal the condition to create a fault alert or flag.

By providing that the information provided to the data collector relates to voltage (V), current (I), phase angle (ϕ), and time (T), many different aspects of the functioning of the apparatus 40 can be monitored. For example, energy consumption can be monitored by measuring V, I, ϕ and T, the activation of various loads within the apparatus can be monitored by measuring V, I and ϕ, and it can be determined by measuring V and I whether one or more loads in the apparatus 40 are within accepted limits.

Figure 3:
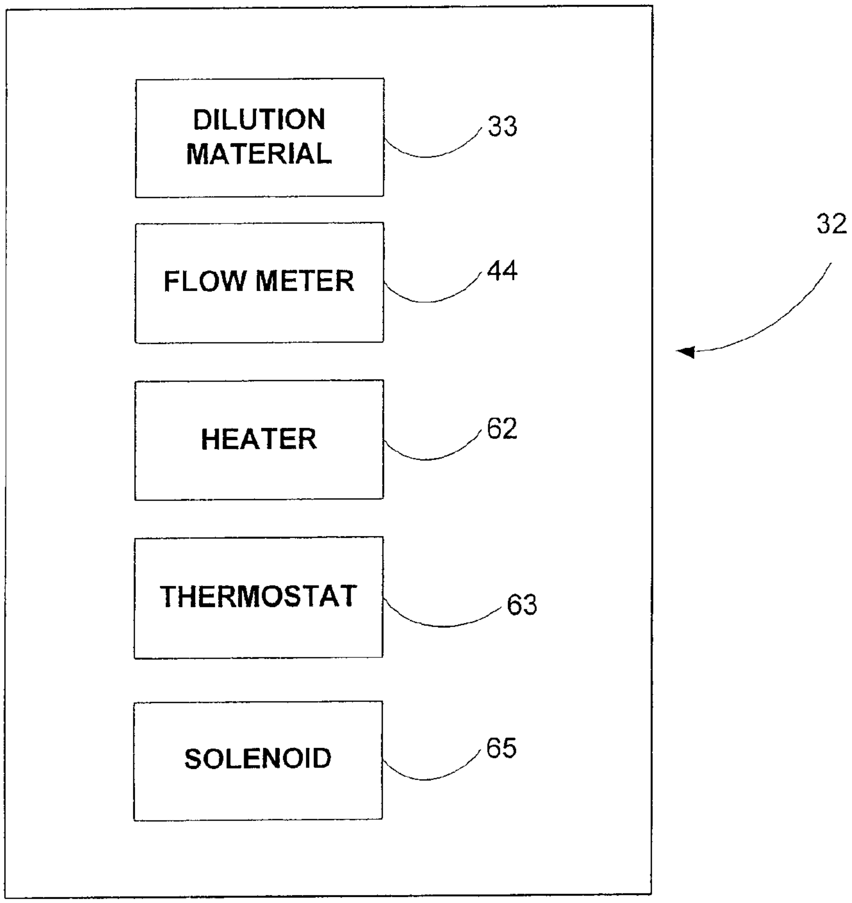
FIG. 3 is a diagrammatic illustration of the dilution source of FIG. 1.

Additionally, the amount of dilution material, such as water, used by the apparatus can be determined by the data collection portion 52 in at least the following two ways: 1) because one gram of water increases in temperature by one degree centigrade for one calorie of added heat, water used by the apparatus 40 can be determined by measuring V, I and T, wherein ending temperature is set by a thermostat 63 (FIG. 3) in the apparatus 40, and beginning temperature can be estimated or measured by the monitoring equipment (i.e., the data collection portion 52) since water is another input which can be monitored; 2) by measuring ϕ and T—wherein ϕ is zero (i.e., all loads in the apparatus 40 are resistive) except when a solenoid 65 (FIG. 3) in the apparatus 40 is turned on. If the apparatus 40 employs a flow regulator, valve on-time multiplied by flow rate will determine total volume. For a 240 volt apparatus, another way of determining solenoid valve on-time is to measure the current in the neutral wire at the power source, wherein the solenoid is a 120 volt device connected between one line and neutral. As discussed above, it is possible to monitor the number of times a solenoid is activated, and then calculate the total amount of dilution material which is used over a given period of time (if the assumption is made that given volume of dilution material is user per solenoid operation).

Still further, the volume of water or other type of dilution material consumed by the apparatus 40 can be monitored by measuring water input using a flow meter and reporting the measurement to the data collection portion 52. Usage patterns can also be monitored by measuring and keeping track of the time of day. Information about usage pattern is useful in determining if an apparatus has the ultimate capacity for its location.

Remotely monitoring the apparatus allows the equipment supplier to evaluate the performance, state, and configuration of the apparatus 40. As such, the supplier or central office can become aware of malfunctions in the equipment as early as possible so that the problem can be corrected quickly, thereby minimizing the amount of downtime and preventing the machine from possibly becoming permanently damaged. Additionally, the information received, such as information relating to the amount of dilution material, such as water, or the amount of product used by the apparatus, may be used to bill the end user, as described in detail above in connection with FIG. 1. The results of the monitoring can be used for still other purposes, such as, the timing of delivery of product, detecting operating anomalies, planning and scheduling maintenance, as well as other purposes.

Figure 5:
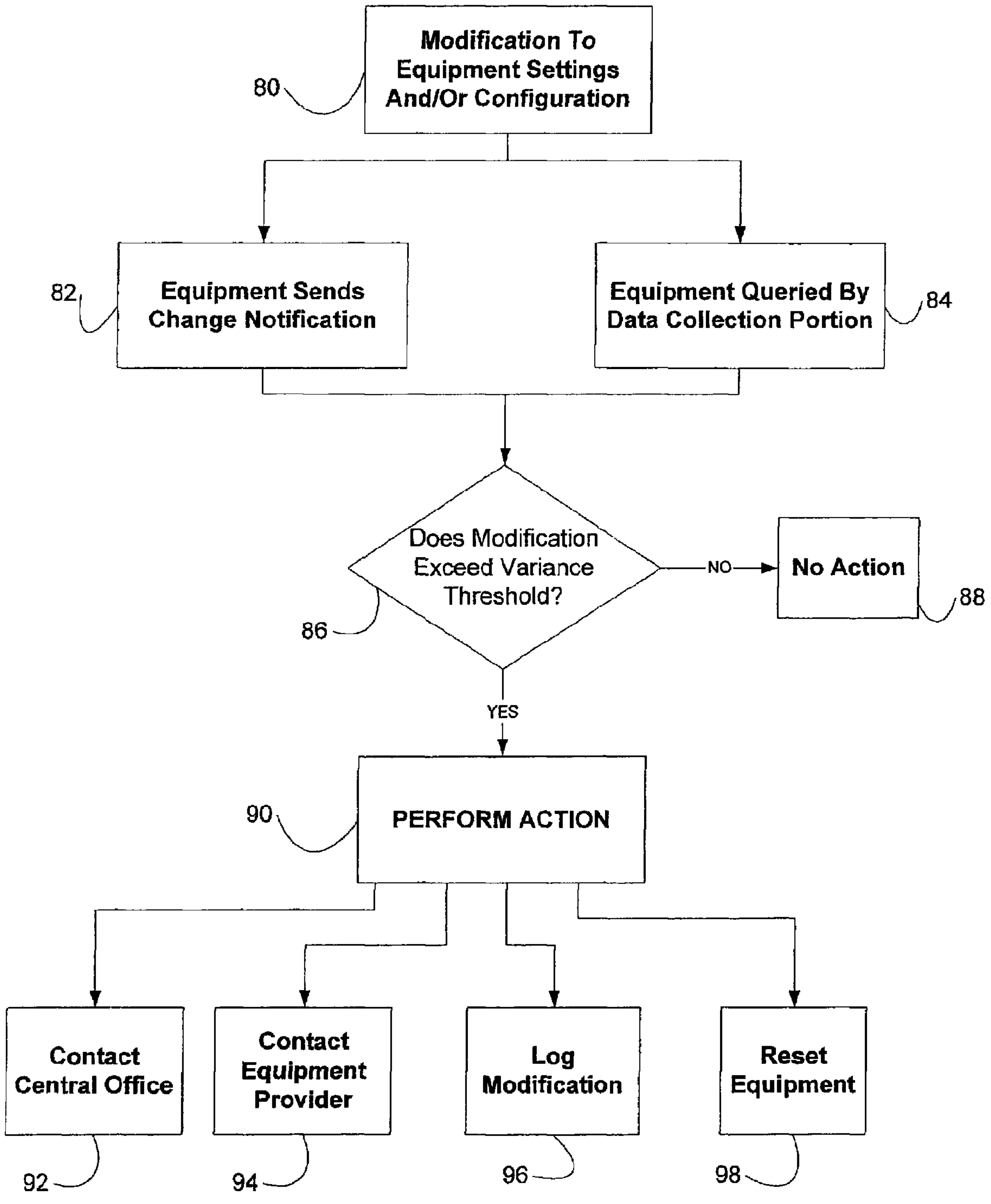
FIG. 5 is a flow diagram of a method for remotely monitoring and controlling beverage equipment.

FIG. 5 shows another method of using a monitorable beverage making apparatus 40 or system 30, such as that shown in FIGS. 1-4, in particular for monitoring anomalies, modifications, non-standard, or unexpected configurations or states of the apparatus 40 or system 30. The method may be particularly useful to equipment suppliers or providers 56 or to a central office 59, such as a franchise headquarters, or management operation related to the equipment supplier 56. In particular the method of FIG. 5 discloses an aspect of possibly taking corrective action when a deviation or modification to apparatus 40 is detected. The method may be implemented by putting apparatus 40 in communication with a modification control system 72 which includes components external of apparatus 40 as shown in FIG. 1.

Step 80 generally discloses a modification to the equipment settings or state which may include any parameter, configuration, variable, value, or other designation related to the apparatus 40. For purposes of the method described in FIG. 5, an equipment settings or states should be broadly interpreted to include but not be limited to a controller setting, operational setting, equipment configuration, menu selection, component position, presence or absence of a component, software module state, inlet, outlet, or internal pressure, temperature, or other property characteristic. A setting may also be related to the nature of the product source, or dilution source, which may include physical qualities such as size, texture, volume, dilution level, or weight, or brand characteristic, such as manufacturer brand or industry quality level.

Such settings can be modified directly or indirectly by an operator. For example, an operator may either by adjusting the internal components of the apparatus 40 or by using some interface change controller 42 settings, such as changing the quantity of beverage product 35 per serving. In this example, a change may be a reduction in the amount of product in order to save on the costs of the raw materials, or be an increase in the amount of beverage product in order to make a beverage stronger or otherwise more desirable. The equipment provider which may, for its own benefit, or as an agent to others, have a duty to oversee the use of the equipment such as to police franchise uniformity guidelines, may object to such modification. A reduction in beverage product may impact the quality of resultant beverage 38. The ultimate beverage drinker may create a connection in their mind between a poor quality drink and the franchise which may directly impact future product sales by the equipment or raw material provider, as well as the franchise.

Other settings may be changed by an operator as well for legitimate or illegitimate purpose, intentionally or unintentionally. The change may include changes to configuration of any of the components discussed above, including but limited to controller 42, dilution source 32, product source 34, meter 44, heater 62, mixing chamber 37, dispensing port 39, thermostat 63, and solenoid 65.

A setting modification may be detected by controller 42 as the modification is being made or in connection with an internal or external diagnostic. A settings change may also be detected in connection with user inputs, such as the user inputting new configuration settings, or identifying a beverage product 34 or dilution source 32 to the apparatus 40.

In step 82, the apparatus or equipment 40 sends a change notification to equipment provider 56. Equipment provider 56 is one potential recipient of the notifications, although other interested parties may also receive the information, including but not limited to the central office 59, equipment user, or equipment owner. The notification may be sent in a manner similar to that of other monitoring signals, such as by using transmission device 50 as discussed above.

Alternatively, as shown in step 84, the equipment or apparatus 40 may be queried by a data collection portion 52 which may include a central server or computer operated by software module containing communication functionality generally known in the art. Step 84 may be used where the equipment provider 56 decides to periodically run a query on one or more apparatuses 40. The frequency of such query may be of any duration including, hourly, daily, monthly, quarterly, or yearly, or over any other selectable period.

The term modification as used in this disclosure is meant to be broadly interpreted as any change, including a change from a previous state, or preselected, predetermined, or factory default condition. A modification may also be any deviation or variation from an intended parameter, such as one or more franchise global settings, states, or configuration values or designations. As such, as an alternative to reporting or being queried to disclose a modification, a modification can also be detected by the apparatus 40 reporting a current condition, state, or configuration which is remotely compared to a previously reported, or otherwise selected or intended values, referred to herein as a predetermined beverage equipment configuration.

In a next step 86, the modification is evaluated against some predetermined threshold amount. The modification/threshold comparison may be for a single setting modification, or for an aggregate of setting modifications. The threshold may be set to filter out insignificant or expected modifications, such as those that occur as a result of planned or programmed automatic changes, naturally occurs as the equipment ages, or when the equipment provider knows a global change to the apparatuses 40 has been made. The evaluation of step 86 may be a straight value comparison between a set value and the reported modification, but may also be a comparison against previously reported values, and may be triggered by an absolute increase or decrease, or by exceeding a percentage-based tolerance. Other calculations, evaluations, and alarm conditions as generally known in the art may be employed as well. If the reported or queried modification fails to exceed the variance threshold, no action may taken as is shown in step 88. Each corrective action discussed below may also be triggered by a different threshold. A threshold may also be preset within the beverage equipment, and, instead of communicating each change to a setup parameter, the equipment may only report a setting or parameter adjusted beyond the threshold.

If the action variance threshold is exceeded, some corrective action is taken (step 90). Each corrective action may have its own variance threshold. That action may include one or more actions 92, 94, 96, and 98. Action 92 involves contacting the central office 59 to report the variance. Central office 59 may pursue another computer operated step or show the results in the form of a report, such as an email or other notification or alert, to a human for further decision-making. Central office may, for example, contact the equipment user and tell them that the variance threshold has been exceeded and corrective action, such as adjusting, resetting or returning the equipment to the previous configuration may be required. In a situation where it is more appropriate for the equipment provider 56 to take such action, or be informed of a modification, equipment provider may be alerted (action 94). Another possible action is to log the modification, which may useful to establish a pattern of modifications, retain evidence of the modifications, or otherwise provide a written record. Logging may be in hard copy and/or soft copy form.

Action 98 is to reset the equipment or apparatus 40. The command to reset the equipment may be sent over the communications path used to send notification of the modification to the data collection portion 52 or over another communication path. This may be more appropriate where the setting modification was made to a volatile or electronic settings, such as programmed dilution quantities. Alternatively, the equipment may be remotely at least partially or fully shut down pending reset of the equipment to a predetermined beverage equipment configuration. The term corrective action is to be broadly interpreted to include any action taken in response to a modification.

One or more software modules used in conjunction with one or more general purpose computers, or be implemented in controller 42, may be employed to provide the functionality described above. The software modules are stored in memory devices and loaded into memory using convention techniques, and are used to operate a processor to form a programmed computer or microcontroller. The term "computer module" or "software module" referenced in this disclosure is meant to be broadly interpreted and cover various types of software code including but not limited to routines, functions, objects, libraries, classes, members, packages, procedures, methods, or lines of code together performing similar functionality to these types of coding. The components of the present disclosure are described herein in terms of functional block components, flow charts and various processing steps. As such, it should be appreciated that such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, SQL, C++, Java, COBOL, assembler, PERL, or the like, with the various algorithms being implemented with any combination of data structures, objects, processes, routines or other programming elements. Further, it should be noted that the present disclosure may employ any number of conventional techniques for data transmission, signaling, data processing, network control, and the like as well as those yet to be conceived.

Modification control system 77 may contain one or more programmed computers operated by software modules containing instructions to provide communication, modification detection, threshold variance comparison, and corrective action steps as described above. Other background program modules, including database software, operating system software, and hardware control software may be selected using any commercially available product known in the art.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicants have provided description and figures which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

What is claimed is:

1. A method of remotely monitoring and controlling beverage equipment, the method comprising the steps of:

providing beverage equipment having a setting for operating the beverage equipment;

detecting an end user modification to the setting of the beverage equipment;

communicating the modification to the setting of the beverage equipment to a designated party; and performing remotely at least one corrective action changing the modification to the setting of the beverage equipment.

2. The method of claim 1, further comprising the end-user modification being an intentional modification.

3. The method of claim 2, further comprising the end-user modification having been made to reduce the amount of raw material needed to make a volume of beverage according to a predetermined ratio.

4. The method of claim 2, further comprising the end-user modification having been made to reduce the amount of beverage powder used to make a diluted beverage.

5. The method of claim 3, further comprising a quality-determining party providing the predetermined ratio.

6. The method of claim 5, further comprising the quality-determining party being one of an equipment provider, a central office, or a franchisor.

7. The method of claim 1, further comprising, prior to the step of detecting, providing beverage equipment that has a beverage dispensing portion and a controller in communication with the beverage dispensing portion.

8. The method of claim 7, further comprising:

providing a controller having at least one equipment setting stored in the controller; and detecting a modification to the at least one equipment setting.

9. The method of claim 8, further comprising providing a communications device in communication with the controller, the communications device being for communicating the modification.

10. The method of claim 9, further comprising the communications device being a two-way communications device.

11. The method of claim 9, further comprising the communication device being one of a modem, a network card, and a global positioning communications device.

12. The method of claim 7, further comprising running a diagnostic using the controller to determine the current state of the beverage dispensing portion and comparing the current state with a previously determined state to detect a modification.

13. The method of claim 12, further comprising a state being one of a voltage, a current, a phase, and a time of power.

14. The method of claim 12, further comprising the state being a physical quantity.

15. The method of claim 14, further comprising the state being one of a size, a texture, a volume, a dilution level, or a weight.

16. The method of claim 12, further comprising the state being one of a brand characteristic and an industry quantity level.

17. The method of claim 12, further comprising the state being a configuration of at least one component of the beverage dispensing portion.

18. The method of claim 17, further comprising the component being one of a controller, a dilution source, a product source, a meter, a heater, a mixing chamber, a dispensing port, a thermostat, and a solenoid.

19. The method of claim 1, further comprising comparing the modification to a variance threshold prior to performing the at least one corrective action, and only performing the at least one corrective action in response to the modification exceeding the variance threshold.

20. The method of claim 19, further comprising providing a different variance threshold for each type of modification.

21. The method of claim 1, further comprising the corrective action being contacting a designated party, the designated party having an interest in maintaining a predetermined beverage equipment configuration.

22. The method of claim 21, further comprising the designated party being one of a central office, a franchise owner, and an equipment provider.

23. The method of claim 22, further comprising providing the equipment to a franchisee.

24. The method of claim 1, further comprising the corrective action being logging the modification.

25. The method of claim 1, further comprising the corrective action being resetting the beverage equipment.

26. The method of claim 25, further comprising the step of resetting the beverage equipment comprising remotely at least partially disabling the equipment until the modification has been reversed.

27. The method of claim 25, further comprising notifying an equipment user of the equipment modification and a need to reverse the equipment modification in order to end the disabling of the equipment.

28. The method of claim 1, further comprising performing the step of detecting the modification on a predetermined interval.

29. The method of claim 28, further comprising the predetermined interval being one of hourly, daily, monthly, quarterly, and yearly.

30. A method of remotely monitoring and controlling beverage equipment, the method comprising the steps of:

providing beverage equipment, the beverage equipment having a beverage dispensing portion and controller in communication with the beverage dispensing portion, the controller having at least one beverage equipment setting stored in the controller;

transmitting the at least one beverage equipment setting to a data collection system over a communications network;

determining an end user modification has been made to the at least one beverage equipment setting; and performing remotely a corrective action to the end user modification of the at least one beverage equipment setting.

31. The method of claim 30, further comprising comparing the modification to a variance threshold prior to performing the at least one corrective action, and only performing the at least one corrective action in response to the modification exceeding the variance threshold.

32. The method of claim 30, further comprising:

the dispensing portion including at least one tube for allowing flow of one of a beverage and a beverage-making substance therethrough, positioning a flow control device along the at least one tube; and using the flow control device to measure a modification.

33. The method of claim 32, further comprising the flow control device being a flow meter.

34. The method of claim 32, further comprising the at least one tube being one of an inlet tube and an outlet tube.

35. A method of remotely monitoring and controlling beverage equipment, the method comprising the steps of providing beverage equipment, the beverage equipment having a beverage dispensing portion having a state, a controller in communication with the beverage dispensing portion, at least one sensor in communication with the beverage dispensing portion and the controller for sensing the state of the beverage dispensing portion, and a transmitting device in communication with the controller;

sensing at least one state of the beverage dispensing portion using the sensor;

sending the at least one state to the transmitting device;

providing a data collection system accessible by a designated party, the data collection system having a communications device in communication with a communications network; transmitting the at least one state from the transmitting device to the data collection system over the communications network via the communications device;

determining that there has been an end user modification to the at least one state; and performing remotely a corrective action to the at least one state.

36. The method of claim 35, further comprising only performing the corrective action in response to the modification exceeding a variance threshold.

37. A system for remotely monitoring and controlling beverage equipment, the system comprising:

beverage equipment, the beverage equipment including a food dispensing portion, a controller in communication with the food dispensing portion, and a communications device in communication with the controller, the controller being operable to determine at least one state of the equipment; and a modification control system in communication with the transmitting device, the modification control system being operable to detect an end user modification to the at least one state and take a remote corrective action based on the modification.

38. The system of claim 37, the modification control system further comprising a general purpose computer operated by at least one program module containing instructions for detecting at least one state of the beverage equipment, comparing the at least one state to at least one preselected state, and determining there has been a modification when a change between the at least one state and the at least one preselected state exceeds a variance threshold.

39. The system of claim 37, the program module further comprising instructions for, in response to determining there has been a modification, resetting the equipment to the at least one preselected state.

40. The system of claim 37, the program module further comprising instructions for sending a notification to the designated party, the designated party being one or more of an equipment provider, a central office, and an equipment user.

41. The system of claim 37, the beverage food dispensing portion further comprising:

a dilution source in communication with the controller;

a product source in communication with the controller; and a mixing passage extending from the dilution source and the product, for allowing mixing of a dilution material and a food product therein.

42. The system of claim 41, further comprising at least one flow monitor positioned along at least one of the dilution source, the product source, and the mixing passage and being in communication with the controller.

43. The system of claim 42, further comprising the flow monitor being a flow meter.

44. The system of claim 41, further comprising:

an inlet valve in communication with the product source and the controller; and a flow monitor positioned along inlet valve and in communication with the controller.

45. The system of claim 41, further comprising:

a heated water reservoir as the dilution source, the heated water reservoir including a dispensing outlet;

a flow monitor positioned along the dispensing outlet, the flow monitor being in communication with the controller.

46. The system of claim 41, further comprising:

a pressurized water line as the dilution source; and a flow monitor positioned along the inlet valve and in communication with the controller.

47. The system of claim 41, further comprising:

a pour-in basin as the dilution source; and a flow monitor positioned along at least a portion of the pour-in basin, the flow monitor being in communication with the controller.

48. The system of claim 37, further comprising at least one additional beverage equipment in communication with the modification control system to form a network of controlled beverage equipment.

49. The system of claim 37, further comprising a data collection portion positioned between and in communication with the controller and the modification control system, the data collection portion being one of internal to the beverage equipment and external to the beverage equipment.

* * * * *